Oct. 15, 1935.  J. C. WOODFORD  2,017,825
FLUID METER
Filed May 22, 1934  3 Sheets-Sheet 3
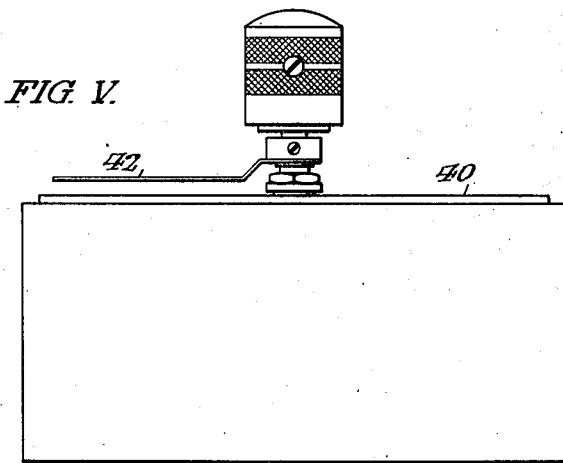
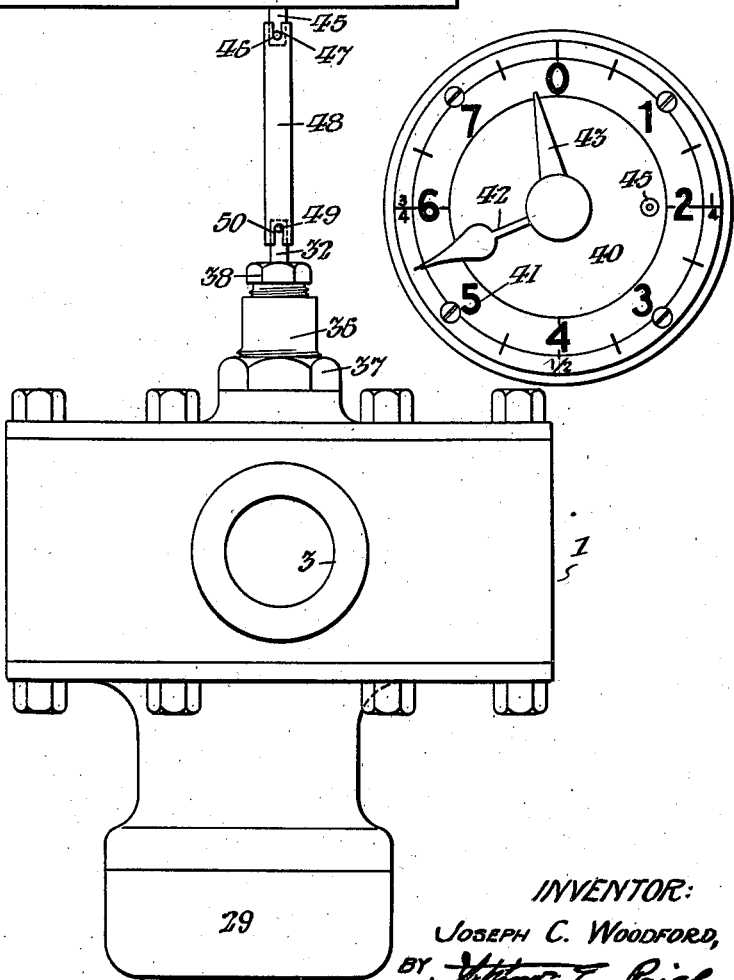
INVENTOR:
JOSEPH C. WOODFORD, Patented Oct. 15, 1935

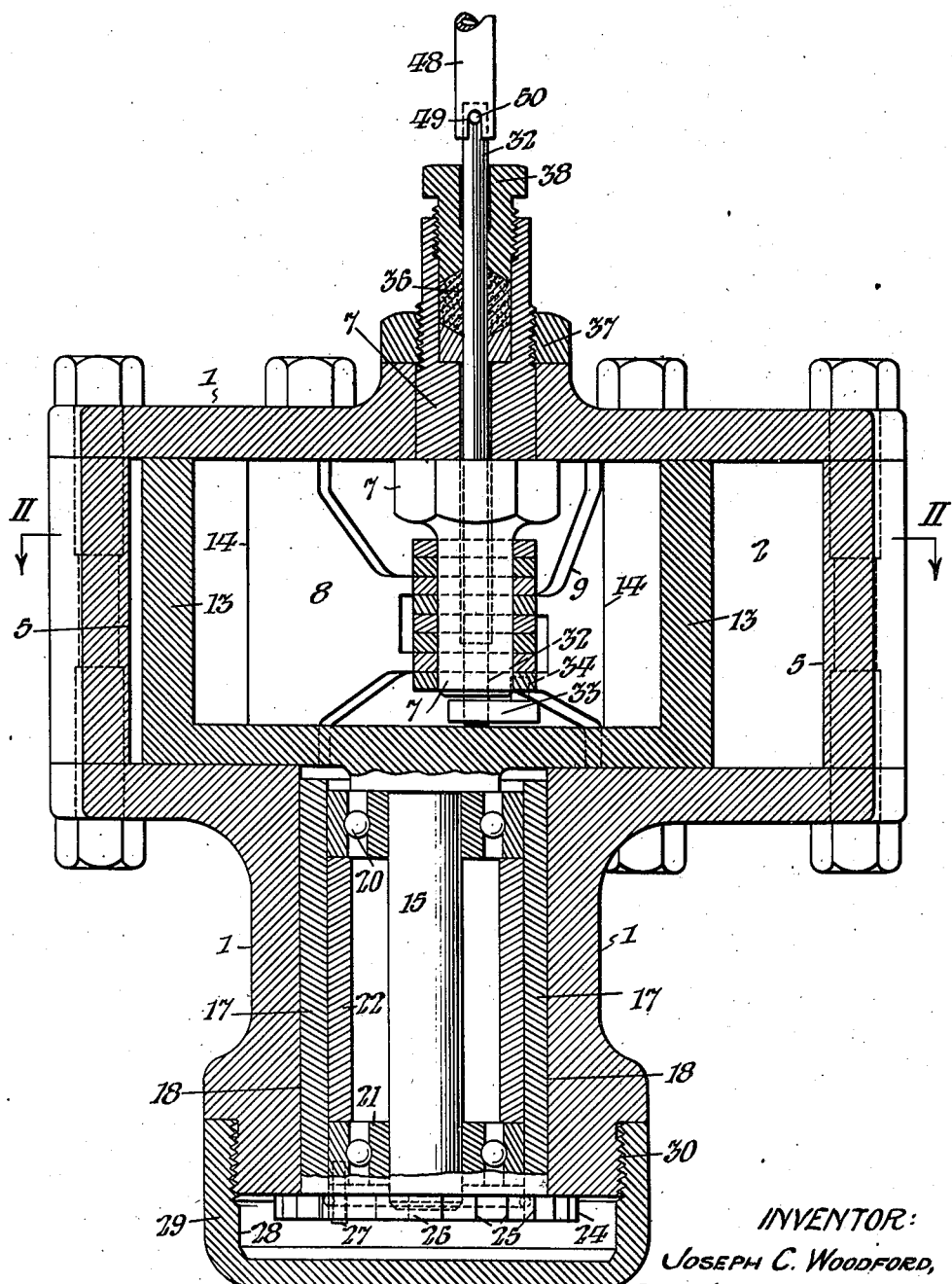

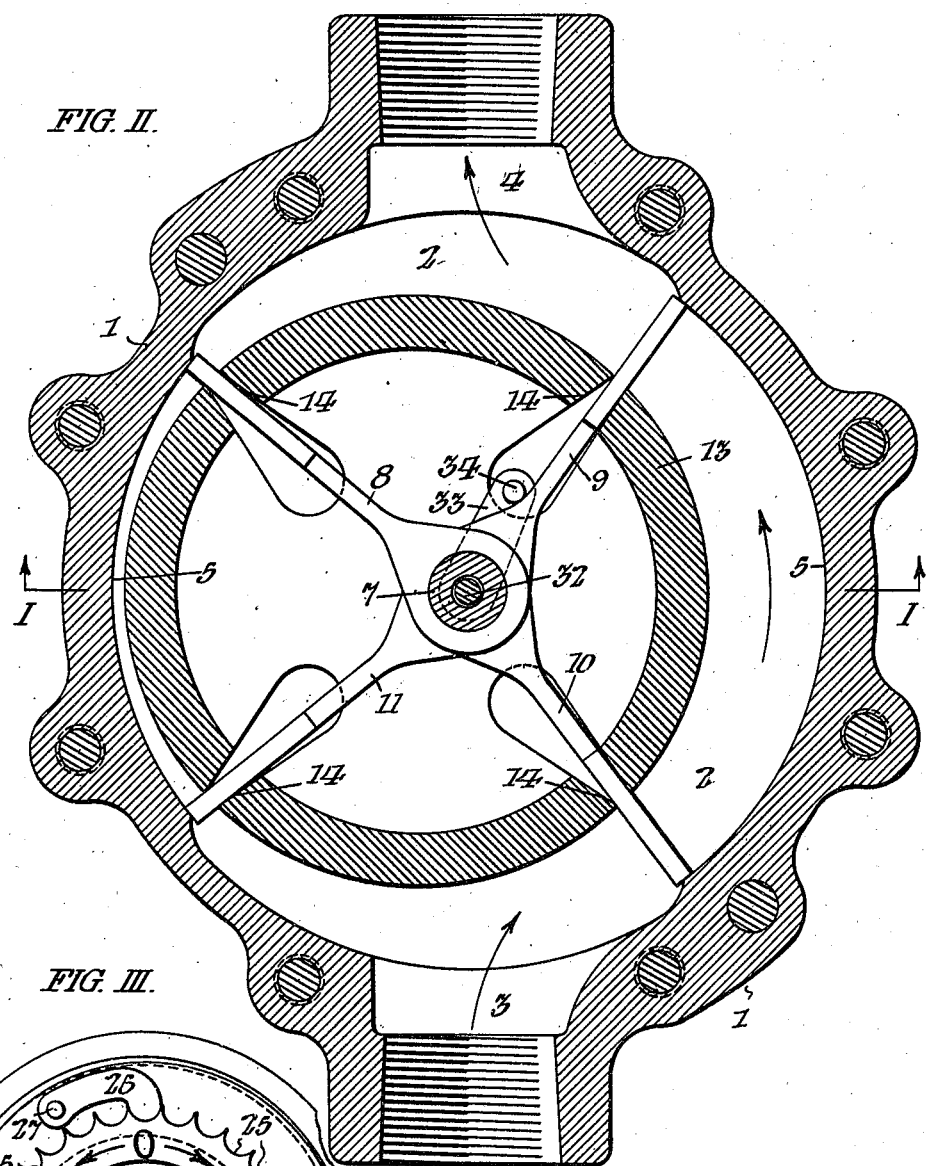
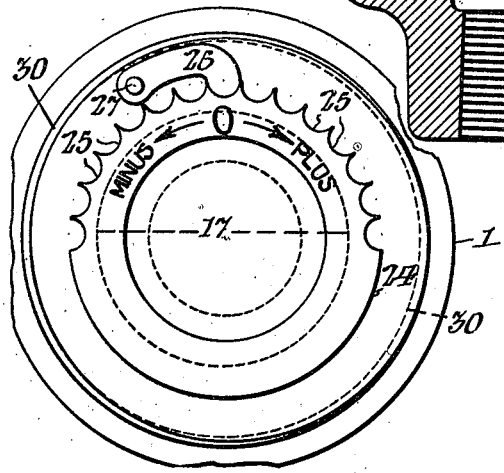

2,017,825

UNITED STATES PATENT OFFICE 2,017,825

FLUID METER

Joseph C. Woodford, Haverford, Pa., assignor to Service Station Equipment Company, Conshohocken, Pa., a corporation of Delaware Application May 22, 1934, Serial No. 726,923
5 Claims. (Cl. 73—37)

I have designated my invention an improvement in meters because it may be conveniently utilized in the construction of a meter operated by the flow of liquid in any liquid dispensing apparatus, for instance, in dispensation of lubricating oil or gasolene or other fuel oil. However, the essential features of my invention may not only be utilized in such a meter, operable by the flow of any fluid therethrough, but may be utilized in the construction of a displacement meter which is in effect a pump for impelling the flow of liquid in a liquid dispensing apparatus or other apparatus.

The form of my invention hereinafter described includes a casing inclosing a fluid chamber having a fluid inlet and a fluid outlet on diametrically opposite sides thereof; said chamber having a cylindrical inner wall in coaxial relation with a stationary stud shaft upon which four similar blades are mounted for independent rotation with their outer ends in close relation with said cylindrical wall. A cylindrical cup-shaped rotor having a series of four equally circumferentially spaced slots in its rim is fitted over said shaft and blades in said chamber with the blades extending through the respective slots in the rotor; said rotor having a shaft in coaxial relation therewith journaled in said casing in eccentric relation with said shaft upon which the blades turn so that said rotor has its perimeter in close proximity to one side of said cylindrical wall of the chamber and in spaced relation with the opposite side of said chamber, and liquid passing through said chamber from said inlet to said outlet pushes upon the blades projecting in the space between said cylindrical wall and rotor and turns the latter. There is more or less leakage of fluid between the inlet and outlet depending upon the viscosity of the fluid and the fit of the blades with respect to the chamber wall and rotor. Therefore, I provide means for varying the eccentricity of the axis of said rotor with respect to the common axis of rotation of said blades so as to precisely determine the volume of fluid passed through said chamber with each revolution of the rotor. Such means include an eccentric bearing sleeve for said rotor shaft, which sleeve is rotatably adjustable in said casing. Moreover, said shaft for the blades is hollow and forms a bearing for a crank shaft extending coaxially therethrough and provided with a crank at its inner end adapted to be turned by contact with one of the blades; said crank shaft being provided at its outer end with indicating means for registering the volume of liquid passed through said chamber; such indicating means including a stationary dial with a circular series of graduations indicating units of volume of fluid and a rotary hand or hands for traversing said dial under actuation of said crank shaft.

My invention includes the various novel features of construction and arrangement hereinafter more definitely specified.

In said drawings, Fig. I is a plan sectional view of a meter embodying my invention taken on the diametrical line I, I, in Fig. II.

Fig. II is a vertical sectional view of said structure shown in Fig. I, taken on the line II, II, in that figure.

Fig. III is an elevation of the lower end of the casing shown in Fig. I with the cap removed, showing the means for adjustably varying the eccentricity of the rotor with respect to the axis of rotation of the blades.

Fig. IV is a front elevation of the volume indicating means including said stationary dial and rotary hands.

Fig. V is an elevation of the structure shown in Fig. I, but on a smaller scale, showing the connection thereof with said volume indicating means.

Referring to said figures; the casing 1 incloses the fluid chamber 2 having the fluid inlet 3 and the fluid outlet 4 on diametrically opposite sides thereof. Said chamber has the cylindrical inner wall 5 in coaxial relation with the stationary stud shaft 7 upon which four similar blades 8, 9, 10, and 11 are mounted for independent rotation with their outer ends in close relation with said cylindrical wall 5. The cylindrical cup-shaped rotor 13 has a series of four equally circumferentially spaced slots 14 in its rim, and is fitted over said shaft 7 and blades in said chamber 2 with the blades extending through the respective slots in said rotor. Said rotor has the shaft 15 in coaxial relation therewith, journaled in said casing 1 in eccentric relation with said shaft 7, upon which said blades turn, so that said rotor has its perimeter in close proximity to one side of said cylindrical wall 5 of the chamber and in spaced relation with the opposite side of said chamber. The construction and arrangement are such that fluid passing through said chamber from said inlet to said outlet pushes upon the blades projecting in the space between the chamber wall 5 and said rotor 13 and turns the latter.

There is more or less leakage of fluid through said casing 1 from the inlet 3 to the outlet 4, depending upon the viscosity of the fluid and the fit of the blades with respect to said chamber wall 5 and rotor 13. Therefore, I provide means for varying the eccentricity of the axis of said rotor 13 with respect to the common axis of rotation of said blades 8, 9, 10, and 11, so as to vary the space between said chamber wall 5 and rotor 13 to precisely determine the volume of fluid passed through said chamber with each revolution of the rotor. Such means include the eccentric bearing sleeve 17 which is journaled in the cylindrical bore 18 in said casing 1 and carries the ball bearings 20 and 21 for said shaft 15; said bearings being held in properly spaced relation in said sleeve 17 by the cylindrical tubular bushing 22 in said sleeve, as shown in Fig. I. As best shown in Fig. III, said sleeve 17 has at its outer end the annular flange 24 with a circumferential series of notches 25 therein adapted to be selectively engaged by the keeper pawl 26 which is fulcrumed upon the stationary stud 27 which is fixed in said casing 1.

As indicated in Fig. III, said pawl is engaged with the notch 25 intermediate of the length of the series of notches and designated by zero. Adjustment of said sleeve clockwise in Fig. III, as indicated by the arrow and the word "Plus", increases the amount of fluid passed through the casing 1 during each revolution of the rotor. Adjustment of said sleeve counterclockwise, as indicated by the arrow and the word "Minus" in Fig. III, decreases the amount of fluid passed through the casing during each revolution of the rotor. Said pawl 26 is prevented from accidental displacement from its adjusted position by contact with the inner wall 28 of the removable cap 29, which wall is indicated by the dotted line in coaxial relation with said casing 1 in Fig. III. As indicated in Fig. I, said cap 29 is normally engaged with said casing 1 by the screw thread 30. It must be removed to permit outward movement of said pawl 26 upon its fulcrum stud 27 to effect any rotary adjustment of said sleeve 17.

Said stationary shaft 7 for the rotary blades is hollow and forms a bearing for the inner end of the crank shaft 32 which extends coaxially therethrough and is provided with the crank 33 at its inner end having the crank pin 34 in contact with the blade 9, as shown in Fig. II, so as to be turned by rotation of said blade in the direction of the arrow indicated in that figure. Said crank shaft 32 extends through the stuffing box 36 which is conveniently formed in the outer end of said shaft 7 which is rigidly connected with said casing 1 by the nut 37, and said shaft is journaled in the adjustable gland 38 of said stuffing box.

Said crank shaft 32 may be utilized to operate any suitable device for indicating the volume of fluid passed through said casing 1. As indicated in Fig. IV; such an indicating device may include a stationary dial 40 having a circular series of graduations 41 thereon indicating units of volume and adapted to be traversed by the long indicating hand 42, one revolution of which represents one such unit, and the short hand 43 which is moved the angular distance from one graduation to the next during each revolution of the hand 42. The mechanism cooperatively connecting said hands 42 and 43 is arranged to be operated by rotation of the shaft 45 and the latter is conveniently connected for actuation by said crank shaft 32 by providing the shaft 45 with the cross pin 46 for engagement in the notch 47 in the tubular shaft 48 which has the notch 49 in its opposite end for engagement with the cross pin 50 on the shaft 32. Such connection permits the shaft 32 to drive the indicating mechanism regardless of slight inaccuracies in the alinement of the shafts 32 and 45.

However, I do not desire to limit myself to the precise details of construction and arrangement herein set forth, as it is obvious that various modifications may be made therein without departing from the essential features of my invention, as defined in the appended claims.

I claim:

1. The combination with a casing inclosing a fluid chamber having a fluid inlet and a fluid outlet and a cylindrical inner wall; of a shaft extending in said chamber in coaxial relation with said wall; a plurality of blades mounted to rotate on said shaft and having their outer ends in close relation with said cylindrical wall; a rotor comprising a hollow cylindrical cup with a series of inwardly flared slots in its rim fitted over said shaft and blades with said blades extending through respective slots in said rotor in direct sliding contact with said rim at the outer ends of said slots; a shaft on said rotor in coaxial relation with said cup; means supporting said rotor shaft with said rotor in said chamber in eccentric relation with said cylindrical wall; and means for adjustably varying the spaces between said rotor and wall and so that diametrically opposite sides of said cup are respectively in close relation with said wall and in spaced relation therewith; whereby predetermined and adjustably variable volumes of fluid are entrapped between the blades, rotor and cylindrical wall and passed through said chamber from said inlet to said outlet during the rotation of said blades and rotor.

2. The combination with a casing inclosing a fluid chamber having a fluid inlet and a fluid outlet and a cylindrical inner wall; of a shaft extending in said chamber in coaxial relation with said wall; a plurality of blades mounted to rotate on said shaft and having their outer ends in close relation with said cylindrical wall; a rotor comprising a hollow cylindrical cup with a series of slots in its rim fitted over said shaft and blades with said blades extending through respective slots in said rotor in direct sliding contact with said rim at the outer ends of said slots; a shaft on said rotor in coaxial relation with said cup; means supporting said rotor shaft with said rotor in said chamber in eccentric relation with said cylindrical wall; so that diametrically opposite sides of said cup are respectively in close relation with said wall and in spaced relation therewith; whereby predetermined volumes of fluid are entrapped between the blades, rotor, and cylindrical wall and passed through said chamber from said inlet to said outlet through the space between said wall and said rotor during the rotation of said blades and rotor; and means for varying the eccentricity of the axis of said rotor with respect to the common axis of rotation of said blades, to precisely determine the volume of fluid passed through said chamber with each revolution of said blades and rotor.

3. The combination with a casing inclosing a fluid chamber having a fluid inlet and a fluid outlet and a cylindrical inner wall; of a shaft extending in said chamber in coaxial relation with said wall; a plurality of blades mounted to rotate on said shaft and having their outer ends in close relation with said cylindrical wall;

a rotor comprising a hollow cylindrical cup with a series of slots in its rim fitted over said shaft and blades with said blades extending through respective slots in said rotor; a shaft on said rotor in coaxial relation with said cup; means supporting said rotor shaft with said rotor in said chamber in eccentric relation with said cylindrical wall; so that diametrically opposite sides of said cup are respectively in close relation with said wall and in spaced relation therewith; whereby, predetermined volumes of fluid are entrapped between the blades, rotor, and cylindrical wall and passed through said chamber from said inlet to said outlet through the space between said wall and said rotor during the rotation of said blades and rotor; and means for varying the eccentricity of the axis of said rotor with respect to the common axis of rotation of said blades, to precisely determine the volume of fluid passed through said chamber with each revolution of said blades and rotor; such means last named including a bearing sleeve for said rotor shaft which is eccentric with respect to said rotor shaft and mounted to be rotatably adjustable in said casing, and means for securing said sleeve in adjusted position.

4. The combination with a casing inclosing a fluid chamber having a fluid inlet and a fluid outlet and a cylindrical inner wall; of a shaft extending in said chamber in coaxial relation with said wall; a plurality of blades mounted to rotate on said shaft and having their outer ends in close relation with said cylindrical wall; a rotor comprising a hollow cylindrical cup with a series of inwardly flared slots in its rim fitted over said shaft and blades with said blades extending through respective slots in said rotor in direct sliding contact with said rim at the outer ends of said slots and a shaft on said rotor in coaxial relation with said cup; means supporting said rotor shaft with said rotor in said chamber in eccentric relation with said cylindrical wall; so that diametrically opposite sides of said cup are respectively in close relation with said wall and in spaced relation therewith; whereby fluid is passed through said chamber from said inlet to said outlet through the space between said wall and said rotor during the rotation of said blades and rotor; said shaft for the rotary blades being hollow, an indicator shaft extended through said blade shaft and having means for turning said indicator shaft in accordance with turning movement of said blades; and volume indicating means operatively connected with said indicator shaft; whereby the volume of fluid passed through said casing may be registered.

5. The combination with a casing inclosing a fluid chamber having a fluid inlet and a fluid outlet and a cylindrical inner wall; of a shaft extending in said chamber in coaxial relation with said wall; a plurality of blades mounted to rotate on said shaft and having their outer ends in close relation with said cylindrical wall; a rotor comprising a hollow cylindrical cup with a series of inwardly flared slots in its rim fitted over said shaft and blades with said blades extending through respective slots in said rotor in direct sliding contact with said rim at the outer ends of said slots and a shaft on said rotor in coaxial relation with said cup; means supporting said rotor shaft with said rotor in said chamber in eccentric relation with said cylindrical wall; so that diametrically opposite sides of said cup are respectively in close relation with said wall and in spaced relation therewith; whereby fluid is passed through said chamber from said inlet to said outlet through the space between said wall and said rotor during the rotation of said blades and rotor; said shaft for the rotary blades being hollow, a crank shaft extended through said blade shaft and having a crank on its inner end adapted to be turned by contact with one of said blades; and volume indicating means operatively connected with said crank shaft; whereby the volume of fluid passed through said casing at each revolution of said rotor may be registered.

JOSEPH C. WOODFORD.